United States Patent [19]
Müller

[11] 3,976,192
[45] Aug. 24, 1976

[54] SLAT CONVEYOR

[76] Inventor: Hugo Stefan Müller, Oettinger Str. 9, D-886 Nordlingen, Germany

[22] Filed: May 3, 1974

[21] Appl. No.: 466,689

[30] Foreign Application Priority Data
May 8, 1973   Germany............................ 2323601

[52] U.S. Cl. ............................................... 198/195
[51] Int. Cl.² ........................................ B65G 15/30
[58] Field of Search .......... 198/195, 189, 199, 196, 198/197, 137; 214/83.36

[56] References Cited
UNITED STATES PATENTS

| | | | |
|---|---|---|---|
| 2,544,484 | 3/1951 | Blackburn...................... | 198/195 X |
| 2,558,832 | 7/1951 | Eriksson.......................... | 198/137 |
| 2,809,742 | 10/1957 | Holz................................ | 198/199 |
| 3,231,070 | 1/1966 | Muller............................. | 198/195 |
| 3,285,395 | 11/1966 | Resener.......................... | 198/189 |
| 3,321,066 | 5/1967 | Christianson .................. | 198/199 |

FOREIGN PATENTS OR APPLICATIONS 624,204   5/1949   United Kingdom................ 198/195

Primary Examiner—Robert J. Spar
Assistant Examiner—James M. Slattery
Attorney, Agent, or Firm—Buell, Blenko & Ziesenheim

[57] ABSTRACT

Conveyor belt is composed of a plurality of mutually parallel spaced endless carriers guided over drums. At least one of the drums is driven. To the outwardly facing side of the carriers are fixed slats and to the inwardly facing side, opposite the slats, are fixed ribs. The ribs are identical and arranged at equal spacing. The driven drum has on its periphery axial grooves arranged with the same spacing as and shaped complementary to the ribs. The ribs engage in the grooves whereby the belt is driven without slipping.

13 Claims, 5 Drawing Figures

SLAT CONVEYOR

BACKGROUND OF THE INVENTION

The invention relates to a slat conveyor having a slat conveyor belt guided over at least two shafts, wherein the slats on which the material to be conveyed is transported are secured on endless carries arranged adjacent one another in the conveying direction in a spaced arrangement.

Such slat conveyors are used on a considerable scale in the textile industry, and are also used in substantially all fields of conveying work, for example in post office work for carrying packets, or in industrial machines and equipment.

The carriers for the slats are usually belts made preferably of leather which are several centimeters in width and of which there are usually a plurality, depending on the width of the conveyor, but at least two belts are arranged spaced from one another and adjacent one another, on which the slats are secured. The slats are usually secured with rivets or screws, by the use of nails or by latching-on.

Depending on the length of the conveyor, it runs over two or more shafts of which at least one is motor driven. Force is transmitted by the adhesion of the leather belts to the smooth shaft surface.

More particularly in the textile industry, slat conveyors are often used wherein the conveyor belt is extremely wide in comparison to its length. Belt widths of 10 to 15 m are not unusual for such slat conveyors.

More particularly with these wide conveyor belts an important disadvantage of hitherto known constructional forms becomes clear. The conveyor belts always tend to run in an oblique or skew fasion. Consequently, the slats are subjected to shearing forces and bending forces which often result in damage. The skew running often results in some slats becoming detached from the slat carrier, or individual slats may become broken if the slats are secured with a very strong connection on the carrier. But in both cases the damage which occurs makes it necessary to stop the conveyor and any other machines connected thereto which depend on its output.

It has already been attempted to obviate the disadvantage of the slats running in a skew fashion by making the slats of very robust construction and securing them with particularly durable securing means on the slat carrier. But it has been found that although in this way it is possible to improve the internal stability of a slat conveyor there is still a danger of fractures. In addition, above all in the textile industry material of very light weight is often transported so that when this is taken into account a powerful and expensive slat construction is not justified.

SUMMARY OF THE INVENTION

The present invention has as its object to provide a slat conveyor of the type initially mentioned whose conveyor belt is so constructed and guided that it con- not run skew.

The invention achieves this object in the case of a slat conveyor of the type initially mentioned in that there are arranged on the underside of the belts flattened ribs which extend trasversely to the direction of conveying and which are identical to one another in construction and are situated at the same spacing, and that at least one driven shaft is profiled in accordance with the underside of the belts, so that a positive engagement is achieved between the profiled shaft and the underside of the belts.

In the new slat conveyor, the slat conveyor belt is constrainedly so guided by engagement of the ribs in the profiled driving shaft that skew running of the slat conveyor is made impossible. Since the slats are now no longer subjected to bending or twisting stresses, there is also no longer a danger that they will become broken or detached by force from the belts supporting them. Therefore, the slats can be made as light as the weight of the material being carried allows, which is important more particularly in the textile industry where textile material of light weight is transported. The dead weight of the slat conveyor belts can often be reduced to such an extent as a result that in the case of relatively long belts the number of shafts supporting the conveyor belt between the end shafts can be reduced.

In the case of a slat conveyor belt provided with ribs, the lateral guiding can be further improved by guiding the ribs in upwardly open U-rails or by guide plates arranged laterally in the direction of conveying. This is a simple but very effective measure.

The precise guiding of slat conveyor belt also makes it possible to reduce considerably the number of belts arranged adjacent one another which support the slats, since the guiding of the conveyor belt no longer requires internal stability to the extent amied at hitherto.

The invention can be used with slat conveyor belts of any desired length. There are no basic difficulties in securing the ribs mechanically to the belts, so that the high degree of dimensional precision required for long belts can be achieved.

Conveniently the ribs are each connected to the belt at two points situated adjacent one another in the direction of conveying. It is then not possible for them to twist relatively to the slats, and they can always engage without strain in the recesses of the profiled driving shaft.

Preferably the ribs are arranged centrally below the slats and have a smaller width than the slats. Thus as hitherto the length of a slat conveyor belt is determined by the number and spacing of the slats. Also, as hitherto, the smallest possible radius of curvature of the slat conveyor belt depends only on the form of the slats and the way they are fixed. This arrangement of the ribs also makes it possible for them to be secured jointly with the associated slat.

Preferably the ribs are rivetted, since this can be carried out in a particularly rational manner. But it is also possible to screw them on or to nail them.

In order not to subject the rivets to any wear and to prevent them producing additional friction when they slide over supporting or guide shafts, the rivets are advantageously arranged in a sunken situation in the ribs.

In a preferred construction of the slat conveyor, the rivets comprise at the upper side of the belts a rounded head and on the nipple thus formed the slats are engaged in a manner known per se in the manner of a press-stud connection. This constitutes a particularly sensible and neat solution for the problem of securing both the slats and the ribs.

A considerable improvement is achieved with a slat conveyor according to the invention if the slats are extruded from polyamide, have a closed hollow profile of the shape of the nipple, and are bored at the underside of the said slats at the securing points.

These slats can be latched in a simple manner on the press-stud nipples because of the special shape of the said slats and they make it unnecessary to provide the hitherto needed special snap engagement elements which were required hitherto, which were inserted in the slat and welded therein. The possibility of doing this is provided for the first time by the careful guiding of the slat conveyor belt according to the invention so that the press-stud connections are no longer subjected to shearing stress. It is only because of this that the slats in the new, comparatively loose securing arrangement do not jump off, whereas the hitherto known snap engagement elements had to ensure a very secure seat. The new slats afford considerable advantages as regards production as compared with the latching-on slats used hitherto.

Preferably the belts on which the slats are secured consist of racked polyamide. This material has sufficient tensile strength, can be nailed, rivetted, screwed and undergoes only an acceptable amount of elongation during operation. But it is also possible to use other materials which have similar properties to the aforesaid, for example belts made of fibre-reinforced rubber.

In a particularly advantageous constructional form of the slat conveyor according to the invention the ribs also consist of polyamide. Such ribs have very good sliding properties. This makes it possible in a slat conveyor arranged in this way to dispense with rotary mounting of the supporting shafts and one end shaft. On the contrary, it is sufficient to profile and drive only one of the end shafts and to move the slat conveyor belt with a sliding action over the other stationary shafts. No wear worth mentioning occurs at the polyamide ribs. The reduction in the apparatus outlay because no shaft has to be given a rotary mounting apart from the driving shaft, is considerable.

The sliding properties of the polyamide ribs are even better if the ribs consist of graphitised polyamide. However, the ribs may also consist of other materials. Another advantageous material is for example leather. It is true that leather does not have the special sliding properties of polyamide, and on the other hand it requires the supporting and guide shafts to be all given rotary mountings. Leather has on the other hand the advantage over other materials that it has a compensating action to some extent. In addition a slat conveyor belt arranged in this way can also be driven by a shaft having a smooth non-profiled surface.

More particularly if the ribs are intended to slide along the surface of stationary supporting and guide shafts, it is advantageous if the ribs have the form of a truncated prismatic body with a small opening angle, and abut with the base surface of the ribs on the underside of the belt. The sliding movement is then not hindered by a sharp edge.

If an S-shaped change of direction is provided for the slat conveyor belt in the slat conveyor, conveniently identical ribs to those on the underside of the belts are provided on the slats also.

If the ribs and the belts on which they are secured are made from polyamide, the press-stud nipples also consist of polyamide and are integral with the associated rib. Such ribs can be produced in a particularly advantageous manner and connected to the belts by a method in the course of which first of all two holes situated adjacent one another are punched in the belt for each rib and then in an injection moulding process with plastics material the ribs are moulded onto the belt integrally with in each case press-stud nipples engaging through the punched holes. This method can be carried out in all stages with an automatic production machine operating in a timed manner and allows a high standard of dimensional precision.

More particularly in conjunction with the already-mentioned latching-on hollow profile slats whose profile is adapted to the shape of press-stud nipples, it is advantageous to carry out a method of producing belts provided with ribs wherein at first a slit extending transversely to the conveying direction is first of all punched in the belt for each rib and then in a plastics injection moulding process the ribs are moulded on the belt integrally each with a latching rail which engages through the punched slits and whose vertical cross-section is similar to that of a press-stud nipple.

This method has the same advantages as the method described previously, but in addition the hollow profile slats are given a better guiding by latching on the said rails.

The invention is described hereinbefore in conjunction with slat conveyors. But it can also be used for other conveyor belts than slat conveyor belts. With conveyor belts made of natural synthetic rubber reinforced with metal cloth or textile fabric, or with plastics materials, problems are also found with skew running and slipping of the conveying belts which can be solved by using ribs on the underside of the belt.

BRIEF DESCRIPTION OF THE DRAWINGS

The invention will now be described, by way of example, with reference to the accompanying diagrammatic drawings. In the drawings:

FIG. 1 shows a slat conveyor, comprising a slat conveyor belt 1, two end shafts or drums 2 and 3, of which the end shaft 2 is driven by a motor in the direction indicated by the arrow, and also a further supporting shaft or roller 4 between the two end shafts 2,3. The slat conveyor belt 1 includes a series of conveyor belts arranged adjacent one another with spacing, one of which is shown, this being designated as 5. Slats 6 are secured on the outwardly facing surface and ribs 7 on the inwardly facing surface of the belts. The ribs 7 have a flat cross-section and are narrower than the slats 6 below which they are arranged centrally.

Figure 4:
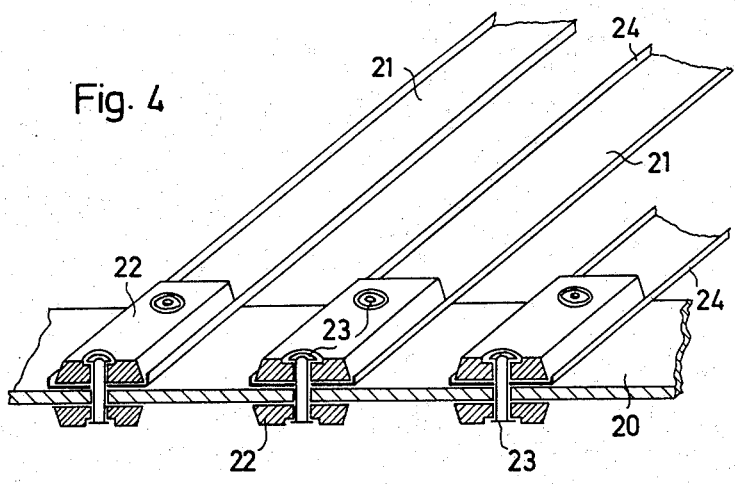
FIG. 4 shows a view partly in section of a light slat conveyor belt with ribs on the upper and lower sides.
Figure 1:
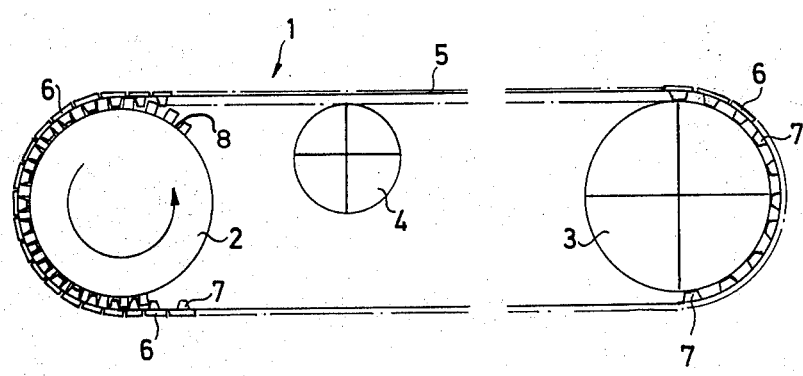
FIG. 1 shows in a diagrammatic manner the guiding of a slat conveyor belt over shafts.

In the region of the belts 5 the driven end shaft 2 is provided with recesses 8 the shape and spacing of which correspond to the shape and spacing of the ribs 7 so that both can engage positively. As a result, the slat conveyor belt 1 is constrainedly driven over its width, and also guided, and cannot run skew.

In the illustrated example the end shaft 3 and the supporting shaft 4 are not capable of rotating, and the ribs 7 slide over the surfaces of these shafts 3,4. As already mentioned, the ribs 7 can slide without difficulty over the stationary shafts 3,4 if they are made of a material such as polyamide which has very good sliding properties.

Figure 2:
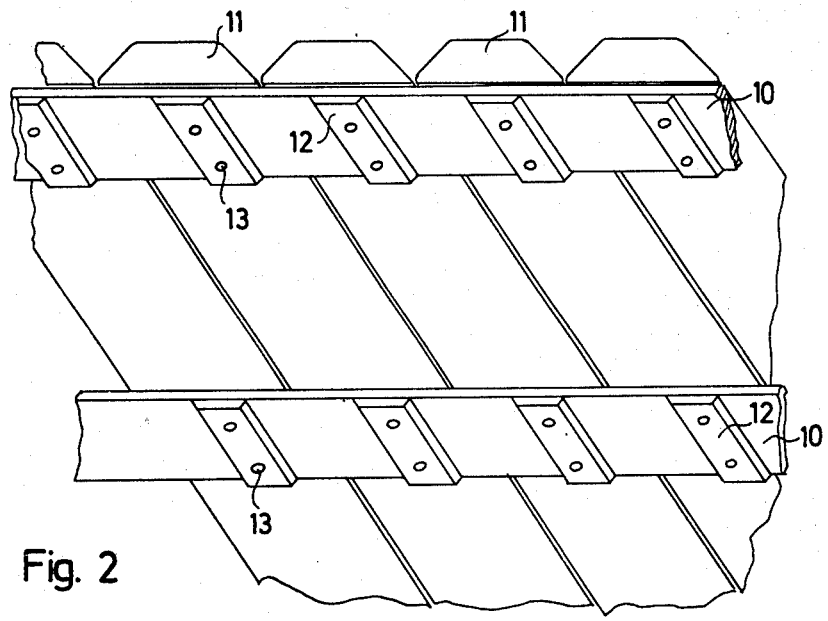
FIG. 2 shows a view of a slat conveyor belt obliquely from below.
Figure 3:
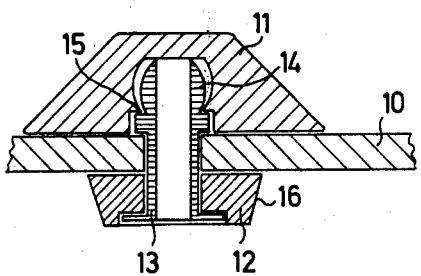
FIG. 3 shows in detail a cross-section through a slat conveyor belt at a fixing point.

FIG. 2 and FIG. 3 show the construction of a slat conveyor belt according to the invention in detail. Ribs 12 are secured on a plurality of adjacent belts 10 on the underside and slats 11 at the top side. The ribs 12 are secured with rivets 13 at two points situated one behind the other in the slat direction in a way which is shown particularly clearly in FIG. 3. The head of each rivet at the upper side of the belt 10 is rounded in shape and is adapted as a press-stud nipple 14 on which the slats 11 can be latched. The slats 11 for this purpose comprise a special cavity with a spring or resilient ring 15 behind which the press-stud nipple 14 engages.

The base of each rivet 13 is positioned in countersunk manner in the corresponding rib 12 and therefore is not subjected to any wear, when the rib slides over the shafts; they also cannot hinder the sliding movements.

The ribs 12 are each secured with two rivets 13 so that they cannot turn relative to the slats. The rib length corresponds to the width of the belts 10 and thus ensures an adequately secure engagement in the recesses of the profiled driven shaft 2.

The belt 10 and the ribs 12 are preferably made of polyamide. Due to this the ribs 12 have high resistance to wear and good sliding properties, so that apart from the driving shaft 2 no other shaft has to be rotatable. The sliding of the ribs 12 over the stationary shafts 3,4 is also made easier by arranging the flanks 16 of the ribs 12 to be slightly inclined.

If the belt 10 and the ribs 12 are made of polyamide, it is convenient to make the press-stud nipples 14 also of polyamide. For in this case the ribs 12 and the press-stud nipples 14 can then be moulded as a single part on the belt 10, in which holes have previously been punched, in a plastics material injection moulding process. In this way the production of the slat conveyor belt is rationalised to a very great extent.

Since the slat conveyor belts according to the invention can no longer run in a skew fashion, very light constructions are possible when only material of very light weight has to be transported. An example is shown in FIG. 4 where thin plastics material slats 21 are secured on carrier belts 20 with spacing from one another. The embodiment differs from the previous embodiments also in that the ribs 22 are arranged both at the underside and also at the top side of the belt 20, so that this slat conveyor belt can also move through S-shaped changes in its course over stationary shafts. Two ribs 22 situated one above the other are rivetted to each other right through the belt 20 in each case. The rivets 23 are arranged in a countersunk manner in the ribs 22 at both ends. The slats conveniently have upwardly projecting edges 24 which give them some bending resistance and at the same time can receive the ribs 22 between themselves.

Figure 5:
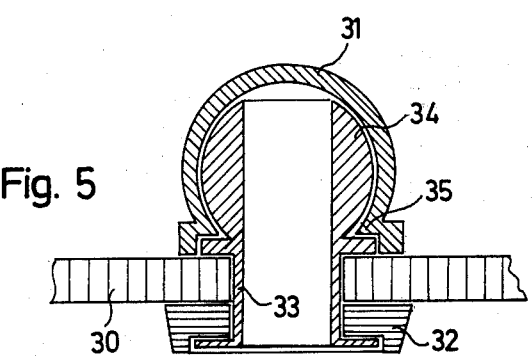
FIG. 5 shows a cross-section through a slat conveyor belt with a new slat.

FIG. 5 shows a further embodiment of a slat conveyor with latch-on slats which is made possible for the first time by the careful guiding of the slat conveyor belt according to the invention. The slats 31 of the conveyor belt 30 are extruded from polyamide in this case and have a closed hollow profile which is adapted to the form of the press-stud nipple 34 or the part of the rivet 33 which is situated on the top side of the carrier belt 30, the said rivet 33 attaching the rib 32 to the underside of the carrier belt 30. The slats 31 have at the places where they are to be latched onto the nipples 34, bores in their underside, through which the nipples 34 fit in. The narrow entrance 35 in the slat profile is conveniently slightly rounded so as to make latching easier.

This relatively loose press-stud connection is made possible for the first time by the precise guiding of the conveyor belt, wherein the press-stud connection is no longer subjected to shearing stress. Previously, in the case of latching-on slats special snap engagement elements were necessary which had to be welded into the slat profile and so designed that they could maintain the press-stud connection even under relatively considerable shearing and pressure forces. The new slat dispenses with the production stages which this involved and which required considerable outlay.

The new slat 31 can be engaged on a latching strip injection moulded on the carrier belt and arranged transversely to the conveying direction instead of being engaged on two press-stud nipples 34 in each case which are secured adjacent one another on the carrier belt 30. The latching strip conveniently has a vertical cross-section which is similar to the cross-section of the press-stud nipple 34. The slats 31 in this way are given a better guiding arrangement and a more secure seat.

I claim:

1. In a slat conveyor having at least two spaced drums, at least one of which is driven for rotation, a slat conveyor belt guided over the drums, the belt being made up of a plurality of endless carriers arranged generally parallel to one another with spacing slats on which the material to be conveyed is transported secured thereto, the improvement comprising elongate flattened ribs equal in number to the number of slats secured to the endless carriers directly opposite and centrally of each slat and secured to each endless carrier in at least two spaced points transverse to the belt and lengthwise of the rib and slat by integrally molded nipples extending through spaced holes in the belt said nipples being rounded above the belt surface to engage frictionally and resiliently in rounded openings in the slats whereby relative shifting of the endless carrier, slat and rib is prevented and a plurality of recesses in the driven drum corresponding to the elongate flattened ribs in size and spacing whereby each rib is engaged as the drum rotates to move the endless carriers and slats.

2. A slat conveyor according to claim 1 wherein the belts on which the slats are secured, are made of racked polyamide.

3. A slat conveyor according to claim 1 wherein the ribs are made of polyamide.

4. A slat conveyor according to claim 1 wherein the ribs are made of graphitised polyamide.

5. A slat conveyor according to claim 1 wherein the ribs are in the form of a truncated prismatic body with a small opening angle and bear with the base surface of the said ribs on the underside of the belt.

6. A slat conveyor according to claim 1 wherein ribs identical to those provided on the underside of the belts are arranged on the slats.

7. A slat conveyor having at least two spaced drums, at least one of which is driven for rotation, a slat conveyor belt guided over the drums, the belt being made up of a plurality of endless carriers arranged generally parallel to one another with spacing slats on which the material to be conveyed is transported secured thereto, the improvement comprising elongate flattened ribs equal in number to the number of slats secured to the endless carriers directly opposite and centrally of each slat and secured to each endless carrier and slat in at least two spaced points transverse to the belt and lengthwise of the rib and slat whereby relative shifting of the endless carrier, slat and rib is prevented and a plurality of recesses in the driven drum corresponding to the elongate flattened ribs in size and spacing whereby each rib is engaged as the drum rotates to move the endless carriers and slats, said ribs being secured to the endless carrier by rivets countersunk in the ribs and passing through the endless carriers and having rounded nipples extending above the surface of the endless carriers removably engaged frictionally and resiliently in rounded openings in the slats, and wherein the slats are extruded from polyamide, have a closed hollow profile of the shape of the nipples and are bored at the underside at the fastening points.

8. A slat conveyor according to claim 7 wherein the rounded nipples are made of polyamide and are integral with the associated rib.

9. A method of producing slat conveyor belts having spaced ribs on one side corresponding in number to the slats to be fixed to the belts and rounded nipples projecting above the belt on the side opposite the rib comprising the steps of punching two spaced holes in the belt for each rib, and injection molding a polyamide rib onto the belt and integrally therewith a pair of rounded nipples extending through said spaced holes and over the belt surface on the side opposite the ribs to hold the ribs in place and to receive resiliently rounded openings in the slats.

10. A method of producing slat conveyor belts having spaced ribs on one side corresponding in number to the slats to be fixed to the belt comprising the steps of forming a slot in the belt at the location of each rib, said slot extending transverse to the direction of conveying and thereafter injection molding a rib of plastic material onto the belt and through the slot at each slot an elongated latching strip extending transversely of the belt having an enlarged end portion adapted to be resiliently engaged in a slot in each slat.

11. In a slat conveyor having at least two spaced drums, at least one of which is driven for rotation, a slat conveyor belt guided over the drums, the belt being made up of a plurality of endless carriers arranged generally parallel to one another with spacing slats on which the material to be conveyed is transported secured thereto, the improvement comprising elongate flattened ribs equal in number to the number of slats secured to the endless carriers directly opposite and centrally of each slat and secured to each endless carrier through a slot extending transverse to the belt and lengthwise of the rib and slat by an integrally molded latching strip extending through said slot and terminating in an enlarged end portion adapted to engage resiliently and frictionally in a slot in the slat whereby relative shifting of the endless carrier, slat and rib is prevented and a plurality of recesses in the driven drum corresponding to the elongate flattened ribs in size and spacing whereby each rib is engaged as the drum rotates to move the endless carriers and slats.

12. A slat conveyor according to claim 11 wherein the ribs and latching strip are molded of polyamide.

13. A slat conveyor according to claim 11 wherein the ribs and latching strip are made of racked polyamide.

* * * * *